United States Patent
Vicario De La Torre et al.

(10) Patent No.: US 12,508,240 B2
(45) Date of Patent: Dec. 30, 2025

(54) LIQUID COMPOSITION COMPRISING IBUPROFEN AND PHENYLEPHRINE

(71) Applicant: NUTRA ESSENTIAL OTC, S.L., Madrid (ES)

(72) Inventors: Marta Vicario De La Torre, Madrid (ES); Nuria Sanz Menéndez, Madrid (ES); José Ángel Sánchez García, Madrid (ES); José Carlos Iglesias Sánchez, Madrid (ES); Luis Sante Serna, Madrid (ES)

(73) Assignee: FARMALÍDER, S.A., Alcobendas (ES)

( * ) Notice: Subject to any disclaimer, the term of this patent is extended or adjusted under 35 U.S.C. 154(b) by 871 days.

(21) Appl. No.: 17/784,846

(22) PCT Filed: Dec. 18, 2020

(86) PCT No.: PCT/EP2020/087107
§ 371 (c)(1),
(2) Date: Jun. 13, 2022

(87) PCT Pub. No.: WO2021/130126
PCT Pub. Date: Jul. 1, 2021

(65) Prior Publication Data
US 2023/0012144 A1  Jan. 12, 2023

(30) Foreign Application Priority Data
Dec. 23, 2019  (EP) .................................... 19383192

(51) Int. Cl.
| | | |
|---|---|---|
| *A61K 31/192* | (2006.01) | |
| *A61K 9/00* | (2006.01) | |
| *A61K 9/10* | (2006.01) | |
| *A61K 31/137* | (2006.01) | |
| *A61K 47/10* | (2017.01) | |
| *A61K 47/26* | (2006.01) | |
| *A61K 47/36* | (2006.01) | |
| *A61K 47/38* | (2006.01) | |

(52) U.S. Cl.
CPC .......... *A61K 31/192* (2013.01); *A61K 9/0053* (2013.01); *A61K 9/10* (2013.01); *A61K 31/137* (2013.01); *A61K 47/10* (2013.01); *A61K 47/26* (2013.01); *A61K 47/36* (2013.01); *A61K 47/38* (2013.01)

(58) Field of Classification Search
CPC ...... A61K 31/192; A61K 9/0053; A61K 9/10; A61K 31/137; A61K 9/0095
See application file for complete search history.

(56) References Cited

U.S. PATENT DOCUMENTS

| | | | | |
|---|---|---|---|---|
| 2008/0014274 A1* | 1/2008 | Bubnis | ................... | A61P 11/14 514/420 |
| 2011/0124730 A1* | 5/2011 | Atkinson | ............. | A61K 9/0095 514/570 |
| 2016/0045465 A1 | 2/2016 | Lomaga | | |

FOREIGN PATENT DOCUMENTS

| | | |
|---|---|---|
| AU | 2015222882 A1 | 8/2016 |
| CN | 101431991 A | 5/2009 |
| CN | 101939411 A | 1/2011 |
| EP | 1059084 | 11/2012 |
| GB | 971700 | 9/1964 |
| WO | WO 98/24414 | 6/1998 |
| WO | WO 2005/115353 | 12/2005 |
| WO | WO 2006/022996 | 3/2006 |
| WO | WO 2007/098128 | 8/2007 |
| WO | WO 2008/008364 | 1/2008 |
| WO | WO 2008/008944 | 1/2008 |
| WO | WO 2008/064192 | 5/2008 |

OTHER PUBLICATIONS

Bhushan et al., Resolution of enantiomers of ibuprofen by liquid chromatography: a review. Biomed Chromatogr. Nov.-Dec. 1998;12(6):309-16.
Asare-Addo et al., Aqueous and hydro-alcoholic media effects on polyols, Colloids and Surfaces B: Biointerfaces, vol. 111, Nov. 1, 2013, pp. 24-29.
Bochkov et al., Effect of high molecular weight excipients on optimization of pharmacokinetic properties of drugs, Pharmacokinetics and Pharmacodynamics, 2016; (1):3-11.
Kovalsky, Increasing the bioavailability of rutin from solid dosage forms by the method of solid dispersions (tesis de doctorado), Moscow, 2015, disponible desde Aug. 19, 2015, p. 24.
Krstonosic et al., Influence of xanthan gum on oil-in-water emulsion characteristics stabilized by OSA starch, Food Hydrocolloids, vol. 45, Mar. 2015, pp. 9-17.
Verhoeven et al., Xanthan gum to tailor drug release of sustained-release ethylcellulose mini-matrices prepared via hot-melt extrusion: in vitro and in vivo evaluation, European Journal of Pharmaceutics and Biopharmaceutics, vol. 63, Issue 3, Jul. 2006, pp. 320-330.

\* cited by examiner

*Primary Examiner* — San Ming R Hui
(74) *Attorney, Agent, or Firm* — Casimir Jones, S.C.; Tristan A. Fuierer

(57) ABSTRACT

The present invention relates to a liquid pharmaceutical composition for oral administration in the form of suspension which comprises the combination of ibuprofen and phenylephrine, or a pharmaceutically acceptable salt thereof, as active substances, and hypromellose, xanthan gum, liquid maltitol, glycerine and water. The composition is stable, has good organoleptical properties and shows excellent pharmacokinetic profile, providing quick absorption of the drugs. The present invention also relates to the use of the composition for treating the symptoms of flu and common cold, particularly in adults and in children over 7 years.

20 Claims, No Drawings

LIQUID COMPOSITION COMPRISING IBUPROFEN AND PHENYLEPHRINE

CROSS-REFERENCE TO RELATED APPLICATIONS

This application is filed under the provisions of 35 U.S.C. § 371 and claims the priority of International Patent Application No. PCT/EP2020/087107 filed on 18 Dec. 2020 entitled "LIQUID COMPOSITION COMPRISING IBUPROFEN AND PHENYLEPHRINE" in the name of Marta VICARIO DE LA TORRE, et al., which claims priority to European Patent Application No. 19383192.2, filed on 23 Dec. 2019, both of which are hereby incorporated by reference herein in their entirety.

TECHNICAL FIELD

The present invention relates to a liquid pharmaceutical composition in the form of suspension comprising the combination of ibuprofen and phenylephrine, which is stable and particularly suitable for the treatment of symptoms of flu and common cold in adults and children.

STATE OF THE ART

The combined use of analgesics and decongestants for the relief of symptoms associated with common cold or flu, such as headache, fever, sinus pressure and minor body aches and pains, is a well-known therapeutic strategy.

One particular approach, for example, is the combination of ibuprofen and phenylephrine. Ibuprofen is a non-steroidal anti-inflammatory drug (NSAID), which has antipyretic and anti-inflammatory properties, while phenylephrine is a sympathomimetic amine that acts predominantly by a direct effect on α-adrenergic receptors and is an oral nasal decongestant.

So far, the combination ibuprofen/phenylephrine is available in the market only as solid oral dosage forms, and it is noticeable that all the available medicines are only intended for adults and children 12 years of age and over.

Thus, for example, the medicine "Advil® Congestion Relief" (FDA, Pfizer) is an oral composition, in the form of tablets, comprising a dose of 200 mg of ibuprofen and 10 mg of phenylephrine hydrochloride (HCl). The recommended dose of this medicine is 1 tablet every 4 hours.

Similarly, the medicine "Care Cold & Flu Relief" (UK, Thornton & Ross) is in the form of film-coated tablets and each dose comprises 200 mg of ibuprofen and 5 mg of phenylephrine HCl. Or the film-coated tablets Grippostad® (ES, Laboratorio Stada) also consist in the fixed-dose combination of 200 mg ibuprofen and 5 mg phenylephrine HCl. Or the film-coated tablets Nurofen® Day & Night Cold & Flu 200 mg/5 mg tablets (UK, Reckitt Benckiser Healthcare). The recommended posology of these three medicines is 2 tablets every 8 hours.

It is recognized that the use of solid oral dosage forms may not be suitable for some patient populations who may have difficulties for swallowing whole tablets or capsules, including the paediatric, geriatric or disabled patients. For those patient populations, the use of liquid formulations is generally regarded as advantageous. In addition, a liquid formulation may be more suitable for adjusting the dose of the active substances according to the age of the patients and for having a greater control over the amount of medicine administered. This point is essential when treatment is aimed at children under 12 years of age.

However, the formulation of liquid pharmaceutical compositions, in general, entails more difficulties than the formulation of solid compositions. For example, there are generally more problems in terms of stability due to the closer interactions between the combined drugs and between the drugs and the excipients. Phenylephrine, specifically, is a drug which is easily degraded, particularly in liquid formulations, and especially at high temperatures.

Furthermore, the formulation of each specific drug combination has to be considered as a particular, unique challenge to be solved, derived from complex interactions within the particular drugs and excipients to be combined, so it cannot be solved by simply combining previously known formulations for each individual drug.

Additionally, for drugs having unpleasant taste, the preparation of palatable liquid formulations is also challenging because, while in solid formulations the bad taste may be masked simply by filling the drug into gelatin capsules or by film-coating tablet formulations, in liquid formulations it is difficult to avoid the direct contact of the bad tasting drug with the mouth gustatory cells when the medicament is ingested. Ibuprofen, for example, is known for having particularly unpleasant bitter, burning taste, and also phenylephrine shows a characteristic bitter taste.

Another additional difficulty lies on the solubility of the drugs to be combined. For example, ibuprofen is virtually insoluble in water and, while its pharmaceutically acceptable salts may be more soluble, their use would then exacerbate the palatability issues. As result of the poor water solubility of ibuprofen, their aqueous formulations are typically suspensions where ibuprofen particles must be in equilibrium to avoid aggregation and sedimentation phenomena. These phenomena frequently appear and are not easy to avoid.

From a pharmacokinetic point of view, it is essential to have a formulation that provides high bioavailability of the active substance and subsequent early and potent therapeutic effect. Drug bioavailability is mainly measured by the time to the maximum concentration observed in plasma ($T_{max}$) and the maximum observed plasma concentration ($C_{max}$). Regarding drug bioavailability, the formulation of liquid preparations entails more difficulties because the use of certain excipients required to improve the stability and palatability of the formula, such as polyols, may hamper the absorption rates of the active substances.

Therefore, for a skilled in the art, it is not obvious to formulate a liquid composition containing ibuprofen and phenylephrine which is stable, organoleptically acceptable and that provides appropriate drug bioavailability.

There are some disclosures in the prior art trying to solve related problems.

Thus, for example, the international patent application WO2008/008944-A1 discloses pharmaceutical suspensions containing phenylephrine and at least one substantially water insoluble active agent, particularly, acetaminophen, which have a pH value of from about 4 to about 6. The compositions comprise non-reducing sugars, polyhydric alcohols, and high intensity sweeteners as sweetening system; preferred sweeting agent is sorbitol, optionally combined with sucrose. The preferred thickening component includes 0.1-0.25% (w/v) of xanthan gum as primary structuring agent and a co-processed combination of microcrystalline cellulose and carboxymethylcellulose as secondary structuring agent. No compositions comprising the specific combination of phenylephrine and ibuprofen are disclosed.

The international patent application WO2007/098128-A2 discloses phenylephrine oral liquid pharmaceutical compositions comprising reduced amounts of sorbitol in order to facilitate the stability of phenylephrine. Specifically, the compositions comprise the combination of glycerin and sorbitol, wherein the amount of glycerin is up to about 45% w/v, preferably comprised between 18-30% w/v of glycerin, and up to about 10% w/v of sorbitol, preferably comprised between 3-10% w/v of sorbitol. No compositions comprising the specific combination of phenylephrine and ibuprofen are disclosed.

The international patent application WO2006/022996-A2 discloses, in general, pharmaceutical compositions comprising a first drug and a second drug, both of which are selected from decongestants, antitussives, expectorants, analgesics and antihistamines, which provide effective plasma concentrations of the drugs. Examples 2, 25, 45, 69 and 72 disclose suspensions comprising phenylephrine combined with other drugs, namely, with promethazine, codeine, carbetapentane or diphenhydramine. The suspension formulations comprise the combination of the polyols sorbitol, glycerine and xylitol as sweetening agents, and the combination of colloidal anhydrous silica and hydroxyethylcellulose as suspending agents. No compositions comprising the specific combination of phenylephrine and ibuprofen are disclosed.

The international patent application WO2008/008364-A2 discloses oral liquid pharmaceutical compositions comprising phenylephrine and substantially aldehyde-free polyethylene glycol, which have reduced propensity for degradation of phenylephrine. The compositions are also palatable. The examples provided comprise additionally the combination of glycerin, sorbitol and micronized sucralose as sweeting system. No stability data for phenylephrine are provided. No compositions comprising the specific combination of phenylephrine and ibuprofen are disclosed.

Therefore, there is still the need of providing liquid formulations comprising the combination of phenylephrine and ibuprofen, which are stable, organoleptically acceptable, useful for paediatric population, and able to afford efficient pharmacologic activity and fast absorption of both active ingredients in order to provide a quick relieve of the symptoms of flu and common cold.

Object of the Invention

The object of the invention is a liquid pharmaceutical composition comprising the combination of ibuprofen and phenylephrine.

Another aspect of the invention is a process for the preparation of the composition.

Another aspect of the invention is the liquid pharmaceutical composition comprising the combination of ibuprofen and phenylephrine for use in medicine.

DETAILED DESCRIPTION OF THE INVENTION

The object of the present invention is a liquid pharmaceutical composition for oral administration in the form of suspension which comprises:
a) Ibuprofen in an amount comprised between 2% w/v and 10% w/v;
b) phenylephrine or a pharmaceutically acceptable salt thereof, in an amount comprised between 0.005% w/v and 2% w/v, expressed as equivalent amount of phenylephrine hydrochloride;
c) hypromellose, in an amount comprised between 0.1% w/v and 5% w/v;
d) xanthan gum, in an amount comprised between 0.05% w/v and 4% w/v;
e) liquid maltitol;
f) glycerine; and
g) water.

The authors of the present invention have developed an aqueous liquid pharmaceutical composition in the form of suspension which comprises the combination of ibuprofen and phenylephrine as active ingredients, which has optimal physicochemical characteristics, in particular, it is outstandingly stable and has good organoleptical properties. Furthermore, the formulation has also excellent pharmacokinetic properties, providing very quick absorption of both drugs and optimal biological availability.

Along the present description, as well as in the claims, the singular expressions, generally preceded by the articles "a", "an" or "the", are meant to include also the plural forms, unless the context clearly indicates otherwise. Furthermore, numeric values preceded by the term "about" or "approximately" are meant to include the exact stated value and also a certain variation around such value, namely a variation or ±5% of the stated amount. Numeric ranges defined by lower and upper endpoints are meant to include also said stated endpoints.

Unless otherwise stated, the percentages disclosed for each component of the composition are weight/volume (% w/v), i.e., grams of each component in 100 ml of the composition.

The excipients used for preparing the composition of the present invention are well known in the art, and widely available, and are described, for example, in the reference book R. C. Rowe, P. J. Sheskey and P. J. Weller, *Handbook of Pharmaceutical Excipients*, Sixth Edition, Pharmaceutical Press, 2009. Also, common excipients and procedures for preparing the compositions are described in the book J. P Remington and A. R. Genaro, *Remington The Science and Practice of Pharmacy*, 20th edition, Lippincott, Williams & Wilkins, Philadelphia, 2000 [ISBN: 0-683-306472] or in the book M. E. Aulton and K. M. G. Taylor, *Aulton's Pharmaceutics, the design and manufacture of medicines*, 4th edition, Churchill Livingstone Elsevier, 2013 [ISBN: 978-0-7020-4290-4].

Ibuprofen

Ibuprofen is the International Nonproprietary Name (INN) for the compound (RS)-2-(4-(2-methylpropyl)phenyl)propanoic acid.

Ibuprofen is a well-known member of non-steroidal anti-inflammatory drugs (NSAIDs) and has analgesic, antipyretic and anti-inflammatory properties.

Within the context of the present invention, the term "ibuprofen" refers indistinctly to racemic ibuprofen (RS), as well as to (S)-ibuprofen and (R)-ibuprofen, or to mixtures of the (R) and (S) forms in any proportion. Preferably, the ibuprofen used in the pharmaceutical composition of the present invention is selected from the group formed by (RS)-ibuprofen and (S)-ibuprofen.

Furthermore, the term ibuprofen also includes any hydrated and solvated form, as well as any crystalline and amorphous form. Preferably, crystalline ibuprofen is used.

Ibuprofen is commercially available and can also be prepared, for example, according to the procedure described in the British patent application GB-A-971700. The resolution of ibuprofen in its enantiomers is described, for example, in the article Brushan et al. *Resolution of enantiomers of ibuprofen by liquid chromatography: a review*, Biomed. Chromatogr., 1998, 12 (6), 309.

Ibuprofen is an acidic molecule, comprising a carboxylic acid moiety, and is poorly soluble in water.

Ibuprofen can be used in therapy both in the acidic free form and as a pharmaceutically acceptable salt thereof, such as ibuprofen arginate, ibuprofen lysinate or ibuprofen sodium, among others. In the context of the present invention, ibuprofen is preferably used in the acidic free form.

The size of ibuprofen particles used to prepare the composition is not critical, but is preferably less than 150 µm in order to minimize aggregation and sedimentation phenomena and, therefore, to improve the long-term stability and homogeneity of the suspension. The size of ibuprofen particles is more preferably comprised between 5 µm and 100 µm, still more preferably comprised between 10 µm and 60 µm, still more preferably comprised between 20 µm and 50 µm, and still more preferably comprised between 30 µm and 45 µm.

The particle size of ibuprofen particles can be quantified by known methods, for example, by sieving through a screen of suitable size.

The concentration of ibuprofen present in the composition of the invention is comprised between 2% and 10%, preferably comprised between 2% and 8%, more preferably comprised between 2% and 7%, still more preferably comprised between 2% and 6%, still more preferably comprised between 2% and 5%, still more preferably comprised between 3% and 5% and still more preferably is about 4%, expressed as w/v percentage. In an embodiment, the concentration of ibuprofen present in the composition of the invention is comprised between greater than 3% and 10%, preferably comprised between greater than 3% and 8%, more preferably comprised between greater than 3% and 7%, still more preferably comprised between greater than 3% and 6%, and still more preferably comprised between greater than 3% and 5%, expressed as w/v percentage. In an embodiment, the concentration of ibuprofen present in the composition of the invention is comprised between 3.3% and 10%, preferably comprised between 3.3% and 8%, more preferably comprised between 3.3% and 7%, still more preferably comprised between 3.3% and 6%, and still more preferably comprised between 3.3% and 5%, expressed as w/v percentage.

Phenylephrine

Phenylephrine is the International Nonproprietary Name (INN) for the compound 3-[(1R)-1-hydroxy-2-(methylamino)ethyl]phenol ((R)-(−)-Phenylephrine, CAS 61-76-7).

Within the context of the present invention, the term "phenylephrine" refers indistinctly to the common R-form, as well as to the racemic or S forms. Preferably, (R)-(−)-phenylephrine is used.

Furthermore, the term phenylephrine also includes any hydrated and solvated form, as well as any crystalline and amorphous form thereof. Preferably crystalline phenylephrine is used.

Phenylephrine is a basic compound, comprising a secondary amine group. Phenylephrine may be used in the free basic form or as a pharmaceutically acceptable salt thereof. The pharmaceutically acceptable salts of phenylephrine include nontoxic acid addition salts.

In one embodiment of the invention, phenylephrine is used as a salt, for example, selected from the addition salts with hydrochloric acid, hydrobromic acid, hydroiodic acid, nitric acid, sulfuric acid, phosphoric acid, lactic acid, citric acid, salicylic acid, tartaric acid, glutamic acid, succinic acid, methanesulfonic acid and benzenesulfonic acid.

In one embodiment of the invention, the pharmaceutically acceptable salt of phenylephrine is selected from the hydrochloride salt (phenylephrine hydrochloride), hydrobromide salt (phenylephrine hydrobromide) and bitartrate salt (phenylephrine bitartrate).

In one preferred embodiment, phenylephrine hydrochloride is used.

The concentration of phenylephrine or a pharmaceutically acceptable salt thereof in the composition of the invention is comprised between 0.005% and 2%, preferably comprised between 0.01% and 1%, more preferably comprised between 0.05% and 0.5%, still more preferably comprised between 0.08% and 0.2% and still more preferably is about 0.1%, expressed as equivalent amount of phenylephrine hydrochloride, as w/v percentage.

The expression "expressed as equivalent amount of phenylephrine hydrochloride" means that, if phenylephrine were added as free base or as a salt different from the hydrochloride salt, the amount of phenylephrine is converted to the equivalent weight of an equimolar amount of phenylephrine hydrochloride. Thus, for example, if 0.82 mg/ml of phenylephrine free base (molecular weight 167.205 g/mol) were used, then the concentration of phenylephrine, "expressed as equivalent amount of phenylephrine hydrochloride" (molecular weight 203.66 g/mol) would be 1 mg/ml or 0.1% w/v. And analogous calculations could be done for other salts, in a similar way, as is well-known to the skilled in the art.

Along the present description, as well as in the claims the amounts and concentrations of phenylephrine are always expressed as the equivalent amount or concentration of phenylephrine hydrochloride.

Thickening Agent/Suspending Agent

The composition of the present invention comprises the combination of xanthan gum and hypromellose (hydroxypropylmethyl cellulose), which act as suspending agents and thickening agents.

Hypromellose (also known as hydroxypropyl methylcellulose or HPMC) is a well-known cellulose derivate used in pharmaceutical formulation. Hypromellose can be described as a partly O-methylated and O-(2-hydroxypropylated) cellulose. It is available in several grades that vary in viscosity and extent of substitution, and all of them are suitable to be used in the composition of the present invention.

Xanthan gum is also a well-known pharmaceutical excipient which is primarily used as suspending agent for the preparation of suspensions, as well as thickening agent. Xanthan gum can be described as a high molecular weight polysaccharide gum. It contains D-glucose and D-mannose as the dominant hexose units, along with D-glucuronic acid, and is prepared as the sodium, potassium, or calcium salt. It is widely commercially available.

The authors of the present invention found out that, surprisingly, the combination of xanthan gum and hypromellose as suspending/thickening system, together with the combination of the polyols glycerine and maltitol, provided outstanding physicochemical stability to the composition and also resulted in improved absorption of the active ingredients and optimal organoleptic properties.

In one embodiment, hypromellose having 7.0 to 12% of hydroxypropoxy content is used (known as hypromellose type 2910).

The proportion of hypromellose in the composition is comprised between 0.1% and 5%, preferably comprised between 0.2% and 2%, more preferably comprised between 0.3% and 1%, still more preferably comprised between 0.4% and 0.6%, and still more preferably is about 0.5%, expressed as w/v percentage.

The proportion of xanthan gum in the composition is comprised between 0.05% and 4%, preferably comprised between 0.1% and 2%, more preferably comprised between 0.2% and 1%, still more preferably comprised between 0.3% and 0.6%, and still more preferably is about 0.4%, expressed as w/v percentage.

The weight ratio hypromellose:xanthan gum is generally comprised in the range 2:1 to 1:1, preferably in the range 1.5:1 to 1:1, and more preferably the weight ratio hypromellose:xanthan gum in the composition is about 1.25:1.

Polyols

The composition of the invention comprises the combination of the polyols glycerine and liquid maltitol.

Glycerine (or glycerol or propane-1,2,3-triol) is a known pharmaceutically acceptable excipient which in oral liquid formulations typically acts as a sweetening agent, co-solvent or viscosity increasing agent.

Maltitol is a disaccharide (4-O-α-D-Glucopyranosyl-D-glucitol).

Liquid maltitol is an aqueous solution D-maltitol which is commonly used as pharmaceutical excipient, complying with the current European Pharmacopoeia where it is stated that liquid maltitol has not less than 68% w/w and not more than 85% w/w of solid matter, that the content of D-maltitol is ≥50% w/w, that it contains no more than 8% w/w of sorbitol, and that it further contains minor amounts of hydrogenated oligo- and polysaccharides. According to the US Pharmacopeia, maltitol solution comprises not less than 50% w/w of D-maltitol on the anhydrous basis, and not more than 8.0% w/w of D-sorbitol.

Typically, for example, liquid maltitol contains from about 50% w/w to about 55% w/w of D-maltitol referred to the total weight of anhydrous matter; and the content of sorbitol is, typically, from about 2% w/w to about 7% w/w, preferably from about 3% w/w to about 5% w/w, also referred to the total weight of anhydrous matter; the content of water is typically in the range 20-30% w/w, preferably about 25% w/w, and the total solid matter typically ranges from about 70% w/w to about 80% w/w, preferably is about 75% w/w.

It is therefore understood that the compositions of the present invention inherently also comprise a small amount of sorbitol, and other minor saccharides that come along with maltitol in the "liquid maltitol" excipient employed. Therefore, whenever along the present description and in the claims the formulations are stated to comprise a specified amount of "liquid maltitol" it is to be understood that, besides maltitol, also small proportions of sorbitol and other saccharides are included, in the specified amount ranges.

It is well within the skill of the skilled in pharmaceutical technology to calculate, if required, the amount of maltitol and the residual amount of sorbitol present in the compositions.

Liquid maltitol is used in oral liquid formulations typically as sweetening agent, and also as suspending agent Maltitol is often considered as an "active excipient" since it modifies intestinal mobility by increasing peristaltic movements and reducing the residence time of active substances in the intestinal lumen.

Typically, the proportion of liquid maltitol in the composition is comprised between 30% and 70%, preferably comprised between 35% and 65%, more preferably comprised between 45% and 55%, and still more preferably is about 50%, expressed as w/v percentage.

Typically, the proportion of glycerine in the composition is comprised between 5% and 15%, preferably comprised between 7% and 13%, more preferably comprised between 9% and 11%, and still more preferably is about 10%, expressed as w/v percentage.

The weight ratio liquid maltitol:glycerine in the pharmaceutical composition of the invention is generally comprised between 10:1 and 1:1, preferably comprised between 7:1 and 3:1 and more preferably is about 5:1.

As disclosed above, the combination of the polyols glycerine and maltitol, together with the combination of xanthan gum and hypromellose as suspending/thickening system, provides outstanding physicochemical stability to the composition, a fast-acting effect of the active ingredients and an improved absorption of ibuprofen, and optimal organoleptic properties.

Additional Optional Ingredients pH Adjusting Agent

The composition of the present invention may contain a pH adjusting agent to maintain the pH of the suspension in the desired pH range. The pH of the composition is generally comprised between 2 and 7, preferably comprised between 2 and 6, more preferably comprised between 2.5 and 5, still more preferably comprised between 3 and 4.5, still more preferably comprised between 3.3 and 4.3 still more preferably comprised between 3.5 and 4, and still more preferably comprised between 3.5 and 3.9.

The amount of the pH adjusting agent in the composition is such that is sufficient to provide the desired degree of pH value, as can be easily adjusted by the skilled in the art. If present, the pH-adjusting agent is typically present in an amount comprised in the range of from about 0.1% to about 2%, expressed as w/v percentage.

The pH adjusting agent may be an acidifying agent, such as citric acid, acetic acid, hydrochloric acid, lactic acid, phosphoric acid, or sulfuric acid, for example, and/or an alkalinizing agent, such as ammonia solution, diethanolamine, monoethanolamine, potassium bicarbonate, sodium bicarbonate, potassium citrate, sodium citrate, sodium bicarbonate, or sodium borate, for example. Preferably, the pH adjusting agent is a buffering agent, for example, citrate buffer, acetate buffer, citrate-phosphate buffer, Tris buffer, or phosphate buffer, for example, among others.

A preferred buffering agent is citrate buffer, which typically may be prepared with citric acid and sodium citrate, for example using anhydrous citric acid and sodium citrate in a weight ratio from 2:1 to 1:2, preferably from 2:1 to 1:1 and more preferably in a weight ratio anhydrous citric acid to sodium citrate of about 1.5:1.

Preservative

The composition may comprise a preservative to ensure its protection against microbial contamination. Suitable preservatives are, for example, butyl paraben, ethyl paraben, methyl paraben, propyl paraben, benzoic acid, benzalkonium chloride, benzethonium chloride, benzyl alcohol, bronopol, chlorhexidine, chlorocresol, chloroxylenol, imidurea, cresol, phenol, sodium benzoate, sorbic acid or thimerosal, for example, among others.

The amount of preservative generally depends on the particular preservative used, as is well known in the art, and typically may range from about 0.001% to about 5%, expressed as w/v percentage. The skilled in the art should have no difficulties in selecting the suitable amount in each case, as disclosed in reference books in the field.

In one embodiment of the invention, the composition comprises a preservative. Preferably, the preservative is selected from butyl paraben, propyl paraben, benzyl alcohol and sodium benzoate, more preferably the preservative is selected from sodium benzoate and benzyl alcohol, and still more preferably the preservative is sodium benzoate, which is typically used in an amount in the range 0.02-0.5% w/v.

Sweetening Agents

Optionally, the composition may comprise a sweetening agent to reinforce the sweetening effect of the polyol mixture, particularly an intense sweetening agent may be used. Intense sweetening agents are generally meant those non-nutritive, high-intensity sweeteners, which are generally from about 100 to about 13000 times sweeter than sucrose.

Suitable intense sweetening agents for use in the present composition are, for example, acesulfame potassium, alitame, neohesperidin dihydrochalcone, neotame, saccharin, saccharin sodium, sucralose, thaumatin, or mixtures thereof.

The amount of the sweetening agent may widely vary depending on the sweetening intensity of the agent, but generally is comprised in the range 0.0001% to 0.5% w/v.

In one embodiment, the composition comprises saccharin sodium, typically in an amount comprised between 0.01% w/v and 0.5% w/v.

In one embodiment, the composition comprises thaumatin, typically in an amount comprised between 0.0001% w/v and 0.01% w/v.

In one embodiment, the composition comprises saccharin sodium and thaumatin, wherein the amount of saccharin sodium is comprised between 0.01% w/v and 0.5% w/v and the amount of thaumatin is comprised between 0.0001% w/v and 0.01% w/v.

Flavour Enhancers

Some sodium salts, such as sodium chloride, sodium acetate or sodium gluconate are inhibitors of bitter taste and enhance other desirable tastes and flavours, such as sweet taste.

Therefore, in one embodiment, the composition of the present invention comprises a flavour enhancer selected from sodium chloride, sodium acetate, sodium gluconate and mixtures thereof, preferably comprises sodium chloride.

The amount of the flavour enhancer, e.g., sodium chloride, in the composition generally ranges from about 0.1% w/v to about 5% w/v.

Flavouring Agents

The composition may optionally additionally comprise a flavouring agent for imparting a pleasant flavour and/or odour to the composition. Suitable flavouring agents include natural and artificial flavours. Natural flavours include natural oils, and extracts from plants, leaves, flowers and fruits. Some suitable flavours are, for example, menthol, cinnamon, clove, anise, eucalyptus, peppermint, spearmint, thyme, vanilla, chocolate, fruit flavours, such as cherry flavour, grape flavour, orange flavour, banana flavour, strawberry flavour, lemon flavour, apple flavour, peach flavour, raspberry flavour, pineapple flavour and apricot flavour among many others, and combinations thereof.

The amount of flavouring agent can be easily adjusted by the skilled formulator, depending on the specific flavouring agent and the desired organoleptic effect. Typically, the amount of flavouring agent, if present in the composition, ranges from about 0.001% w/v to about 0.1% w/v.

Compositions

Water is the main solvent of the formulation. Typically, purified water is used. The exact percentage of water is not quantified, as it is adjusted to a certain final volume, to provide the desired concentration of every ingredient.

The composition of the present invention is in the form of a suspension. A suspension, as is well known in pharmaceutical formulation, is as a two-phase system consisting of an undissolved or immiscible solid dispersed in a liquid. The solid particles dispersed may have a mean particle size generally comprised from about 1.0 nm to about 150 µm, without agglomerates. Ibuprofen is a poorly soluble drug which mainly constitutes the solid dispersed phase of the suspension.

In one embodiment, the present invention relates to a liquid pharmaceutical composition for oral administration in the form of suspension which comprises:

a) Ibuprofen in an amount comprised between 2% w/v and 10% w/v, preferably comprised between 2% w/v and 8% w/v, more preferably comprised between 2% and 7%, still more preferably comprised between 2% and 6%, still more preferably comprised between 2% and 5%, still more preferably comprised between 3% w/v and 5% w/v and still more preferably in an amount of about 4% w/v;

b) phenylephrine or a pharmaceutically acceptable salt thereof, in an amount comprised between 0.005% w/v and 2% w/v, preferably comprised between 0.01% w/v and 1% w/v, more preferably comprised between 0.05% w/v and 0.5% w/v, still more preferably comprised between 0.08% w/v and 0.2% w/v and still more preferably in an amount of about 0.1% w/v, expressed as equivalent amount of phenylephrine hydrochloride;

c) hypromellose, in an amount comprised between 0.1% w/v and 5% w/v, preferably comprised between 0.2% w/v and 2% w/v, more preferably comprised between 0.3% w/v and 1% w/v, still more preferably comprised between 0.4% w/v and 0.6% w/v, and still more preferably of about 0.5% w/v;

d) xanthan gum, in an amount comprised between 0.05% w/v and 4% w/v, preferably comprised between 0.1% w/v and 2% w/v, more preferably comprised between 0.2% w/v and 1% w/v, still more preferably comprised between 0.3% w/v and 0.6% w/v, and still more preferably of about 0.4% w/v;

e) liquid maltitol, generally in an amount comprised between 30% w/v and 70% w/v, preferably comprised between 35% w/v and 65% w/v, more preferably comprised between 45% w/v and 55% w/v, and still more preferably of about 50% w/v;

f) glycerine, generally in an amount comprised between 5% w/v and 15% w/v, preferably comprised between 7% w/v and 13% w/v, more preferably comprised between 9% w/v and 11% w/v, and still more preferably of about 10% w/v;

g) water;

h) optionally, a pH adjusting agent, preferably selected from citrate buffer, acetate buffer, citrate-phosphate buffer, Tris buffer and phosphate buffer, more preferably citrate buffer;

i) optionally, a preservative, preferably selected from butyl paraben, propyl paraben, benzyl alcohol and sodium benzoate, more preferably selected from benzyl alcohol and sodium benzoate, and more preferably is sodium benzoate;

j) optionally, a sweetening agent, preferably selected from acesulfame potassium, alitame, neohesperidin dihydrochalcone, neotame, saccharin, saccharin sodium, sucralose, thaumatin, and mixtures thereof, more preferably is a mixture of saccharin sodium and thaumatin;

k) optionally, a flavour enhancer selected from sodium chloride, sodium acetate or sodium gluconate, preferably is sodium chloride, generally in an amount comprised between 0.1% w/v and 5% w/v;

l) optionally, a flavouring agent, preferably in an amount comprised between 0.001% w/v and 0.1% w/v.

wherein, preferably, the composition comprises and at least one of the optional ingredients h) to l).

A particular composition within this embodiment essentially consists of the above listed ingredients.

In one embodiment, the present invention relates to a liquid pharmaceutical composition for oral administration in the form of suspension which comprises:
a) Ibuprofen in an amount comprised between 2% w/v and 10% w/v, preferably comprised between 2% w/v and 8% w/v, more preferably comprised between 2% and 7%, still more preferably comprised between 2% and 6%, still more preferably comprised between 2% and 5%, still more preferably comprised between 3% w/v and 5% w/v and still more preferably in an amount of about 4% w/v;
b) phenylephrine or a pharmaceutically acceptable salt thereof, in an amount comprised between 0.005% w/v and 2% w/v, preferably comprised between 0.01% w/v and 1% w/v, more preferably comprised between 0.05% w/v and 0.5% w/v, still more preferably comprised between 0.08% w/v and 0.2% w/v and still more preferably in an amount of about 0.1% w/v, expressed as equivalent amount of phenylephrine hydrochloride;
c) hypromellose, in an amount comprised between 0.1% w/v and 5% w/v, preferably comprised between 0.2% w/v and 2% w/v, more preferably comprised between 0.3% w/v and 1% w/v, still more preferably comprised between 0.4% w/v and 0.6% w/v, and still more preferably of about 0.5% w/v;
d) xanthan gum, in an amount comprised between 0.05% w/v and 4% w/v, preferably comprised between 0.1% w/v and 2% w/v, more preferably comprised between 0.2% w/v and 1% w/v, still more preferably comprised between 0.3% w/v and 0.6% w/v, and still more preferably of about 0.4% w/v;
e) liquid maltitol, generally in an amount comprised between 30% w/v and 70% w/v, preferably comprised between 35% w/v and 65% w/v, more preferably comprised between 45% w/v and 55% w/v, and still more preferably of about 50% w/v;
f) glycerine, generally in an amount comprised between 5% w/v and 15% w/v, preferably comprised between 7% w/v and 13% w/v, more preferably comprised between 9% w/v and 11% w/v, and still more preferably of about 10% w/v;
g) water;
h) a pH adjusting agent, preferably selected from citrate buffer, acetate buffer, citrate-phosphate buffer, Tris buffer and phosphate buffer, more preferably citrate buffer;
i) a preservative, preferably selected from butyl paraben, propyl paraben, benzyl alcohol and sodium benzoate, more preferably selected from benzyl alcohol and sodium benzoate, and more preferably is sodium benzoate;
j) optionally, a sweetening agent, preferably selected from acesulfame potassium, alitame, neohesperidin dihydrochalcone, neotame, saccharin, saccharin sodium, sucralose, thaumatin, and mixtures thereof, more preferably is a mixture of saccharin sodium and thaumatin;
k) optionally, a flavour enhancer selected from sodium chloride, sodium acetate or sodium gluconate, preferably is sodium chloride, generally in an amount comprised between 0.1% w/v and 5% w/v; and
l) optionally, a flavouring agent, preferably in an amount comprised between 0.001% w/v and 0.1% w/v.

A particular composition within this embodiment essentially consists of the above listed ingredients.

In one embodiment, the present invention relates to a liquid pharmaceutical composition for oral administration in the form of suspension which comprises:
a) Ibuprofen in an amount comprised between 2% w/v and 10% w/v, preferably comprised between 2% w/v and 8% w/v, more preferably comprised between 2% and 7%, still more preferably comprised between 2% and 6%, still more preferably comprised between 2% and 5%, still more preferably comprised between 3% w/v and 5% w/v and still more preferably in an amount of about 4% w/v;
b) phenylephrine or a pharmaceutically acceptable salt thereof, in an amount comprised between 0.005% w/v and 2% w/v, preferably comprised between 0.01% w/v and 1% w/v, more preferably comprised between 0.05% w/v and 0.5% w/v, still more preferably comprised between 0.08% w/v and 0.2% w/v and still more preferably in an amount of about 0.1% w/v, expressed as equivalent amount of phenylephrine hydrochloride;
c) hypromellose, in an amount comprised between 0.1% w/v and 5% w/v, preferably comprised between 0.2% w/v and 2% w/v, more preferably comprised between 0.3% w/v and 1% w/v, still more preferably comprised between 0.4% w/v and 0.6% w/v, and still more preferably of about 0.5% w/v;
d) xanthan gum, in an amount comprised between 0.05% w/v and 4% w/v, preferably comprised between 0.1% w/v and 2% w/v, more preferably comprised between 0.2% w/v and 1% w/v, still more preferably comprised between 0.3% w/v and 0.6% w/v, and still more preferably of about 0.4% w/v;
e) liquid maltitol, generally in an amount comprised between 30% w/v and 70% w/v, preferably comprised between 35% w/v and 65% w/v, more preferably comprised between 45% w/v and 55% w/v, and still more preferably of about 50% w/v;
f) glycerine, generally in an amount comprised between 5% w/v and 15% w/v, preferably comprised between 7% w/v and 13% w/v, more preferably comprised between 9% w/v and 11% w/v, and still more preferably of about 10% w/v;
g) water;
h) a pH adjusting agent, preferably selected from citrate buffer, acetate buffer, citrate-phosphate buffer, Tris buffer and phosphate buffer, more preferably citrate buffer;
i) a preservative, preferably selected from butyl paraben, propyl paraben, benzyl alcohol and sodium benzoate, more preferably selected from benzyl alcohol and sodium benzoate, and more preferably is sodium benzoate;
j) a sweetening agent, preferably selected from acesulfame potassium, alitame, neohesperidin dihydrochalcone, neotame, saccharin, saccharin sodium, sucralose, thaumatin, and mixtures thereof, more preferably is a mixture of saccharin sodium and thaumatin;
k) optionally, a flavour enhancer selected from sodium chloride, sodium acetate or sodium gluconate, preferably is sodium chloride, generally in an amount comprised between 0.1% w/v and 5% w/v; and
l) optionally, a flavouring agent, preferably in an amount comprised between 0.001% w/v and 0.1% w/v.

A particular composition within this embodiment essentially consists of the above listed ingredients.

In one embodiment, the present invention relates to a liquid pharmaceutical composition for oral administration in the form of suspension which comprises:

a) Ibuprofen in an amount comprised between 2% w/v and 10% w/v, preferably comprised between 2% w/v and 8% w/v, more preferably comprised between 2% and 7%, still more preferably comprised between 2% and 6%, still more preferably comprised between 2% and 5%, still more preferably comprised between 3% w/v and 5% w/v and still more preferably in an amount of about 4% w/v;

b) phenylephrine or a pharmaceutically acceptable salt thereof, in an amount comprised between 0.005% w/v and 2% w/v, preferably comprised between 0.01% w/v and 1% w/v, more preferably comprised between 0.05% w/v and 0.5% w/v, still more preferably comprised between 0.08% w/v and 0.2% w/v and still more preferably in an amount of about 0.1% w/v, expressed as equivalent amount of phenylephrine hydrochloride;

c) hypromellose, in an amount comprised between 0.1% w/v and 5% w/v, preferably comprised between 0.2% w/v and 2% w/v, more preferably comprised between 0.3% w/v and 1% w/v, still more preferably comprised between 0.4% w/v and 0.6% w/v, and still more preferably of about 0.5% w/v;

d) xanthan gum, in an amount comprised between 0.05% w/v and 4% w/v, preferably comprised between 0.1% w/v and 2% w/v, more preferably comprised between 0.2% w/v and 1% w/v, still more preferably comprised between 0.3% w/v and 0.6% w/v, and still more preferably of about 0.4% w/v;

e) liquid maltitol, generally in an amount comprised between 30% w/v and 70% w/v, preferably comprised between 35% w/v and 65% w/v, more preferably comprised between 45% w/v and 55% w/v, and still more preferably of about 50% w/v;

f) glycerine, generally in an amount comprised between 5% w/v and 15% w/v, preferably comprised between 7% w/v and 13% w/v, more preferably comprised between 9% w/v and 11% w/v, and still more preferably of about 10% w/v;

g) water;

h) a pH adjusting agent, preferably selected from citrate buffer, acetate buffer, citrate-phosphate buffer, Tris buffer and phosphate buffer, more preferably citrate buffer;

i) a preservative, preferably selected from butyl paraben, propyl paraben, benzyl alcohol and sodium benzoate, more preferably selected from benzyl alcohol and sodium benzoate, and more preferably is sodium benzoate;

j) a sweetening agent, preferably selected from acesulfame potassium, alitame, neohesperidin dihydrochalcone, neotame, saccharin, saccharin sodium, sucralose, thaumatin, and mixtures thereof, more preferably is a mixture of saccharin sodium and thaumatin;

k) a flavour enhancer selected from sodium chloride, sodium acetate or sodium gluconate, preferably is sodium chloride, generally in an amount comprised between 0.1% w/v and 5% w/v, and l) optionally, a flavouring agent, preferably in an amount comprised between 0.001% w/v and 0.1% w/v.

A particular composition within this embodiment essentially consists of the above listed ingredients.

In one embodiment, the present invention relates to a liquid pharmaceutical composition for oral administration in the form of suspension which comprises:

a) Ibuprofen in an amount comprised between 2% w/v and 10% w/v, preferably comprised between 2% w/v and 8% w/v, more preferably comprised between 2% and 7%, still more preferably comprised between 2% and 6%, still more preferably comprised between 2% and 5%, still more preferably comprised between 3% w/v and 5% w/v and still more preferably in an amount of about 4% w/v;

b) phenylephrine or a pharmaceutically acceptable salt thereof, in an amount comprised between 0.005% w/v and 2% w/v, preferably comprised between 0.01% w/v and 1% w/v, more preferably comprised between 0.05% w/v and 0.5% w/v, still more preferably comprised between 0.08% w/v and 0.2% w/v and still more preferably in an amount of about 0.1% w/v, expressed as equivalent amount of phenylephrine hydrochloride;

c) hypromellose in an amount comprised between 0.1% w/v and 5% w/v, preferably comprised between 0.2% w/v and 2% w/v, more preferably comprised between 0.3% w/v and 1% w/v, still more preferably comprised between 0.4% w/v and 0.6% w/v, and still more preferably of about 0.5% w/v;

d) xanthan gum, in an amount comprised between 0.05% w/v and 4% w/v, preferably comprised between 0.1% w/v and 2% w/v, more preferably comprised between 0.2% w/v and 1% w/v, still more preferably comprised between 0.3% w/v and 0.6% w/v, and still more preferably of about 0.4% w/v;

e) liquid maltitol, generally in an amount comprised between 30% w/v and 70% w/v, preferably comprised between 35% w/v and 65% w/v, more preferably comprised between 45% w/v and 55% w/v, and still more preferably of about 50% w/v;

f) glycerine, generally in an amount comprised between 5% w/v and 15% w/v, preferably comprised between 7% w/v and 13% w/v, more preferably comprised between 9% w/v and 11% w/v, and still more preferably of about 10% w/v;

g) water;

h) a pH adjusting agent, preferably selected from citrate buffer, acetate buffer, citrate-phosphate buffer, Tris buffer and phosphate buffer, more preferably citrate buffer;

i) a preservative, preferably selected from butyl paraben, propyl paraben, benzyl alcohol and sodium benzoate, more preferably selected from benzyl alcohol and sodium benzoate, and more preferably is sodium benzoate;

j) a sweetening agent, preferably selected from acesulfame potassium, alitame, neohesperidin dihydrochalcone, neotame, saccharin, saccharin sodium, sucralose, thaumatin, and mixtures thereof, more preferably is a mixture of saccharin sodium and thaumatin;

k) a flavour enhancer selected from sodium chloride, sodium acetate or sodium gluconate, preferably is sodium chloride, generally in an amount comprised between 0.1% w/v and 5% w/v, and l) a flavouring agent, preferably in an amount comprised between 0.001% w/v and 0.1% w/v.

A particular composition within this embodiment essentially consists of the above listed ingredients.

The preferred characteristics of the different components of those compositions are as disclosed above in this description, under the relevant paragraphs (ibuprofen, phenylephrine, thickening agent/suspending agent, polyols and additional optional ingredients).

In a further embodiment, in any of the above embodiments, the concentration of ibuprofen present in the composition of the invention is comprised between greater than 3% and 10%, preferably comprised between greater than 3% and 8%, more preferably comprised between greater than 3% and 7%, still more preferably comprised between greater than 3% and 6%, and still more preferably comprised between greater than 3% and 5%, expressed as w/v percentage. More particularly, the concentration of ibuprofen present in the composition of the invention is comprised between 3.3% and 10%, preferably comprised between 3.3% and 8%, more preferably comprised between 3.3% and 7%, still more preferably comprised between 3.3% and 6%, and still more preferably comprised between 3.3% and 5%, expressed as w/v percentage.

In a preferred composition the weight ratio ibuprofen:phenylephrine is about 40:1, (calculated taking the weight of the equivalent amount of phenylephrine hydrochloride, regardless of the phenylephrine form used), for example, compositions comprising about 4% w/v of ibuprofen and about 0.1% w/v of phenylephrine or a pharmaceutically acceptable salt thereof, expressed as equivalent concentration of phenylephrine hydrochloride, or compositions comprising about 2% w/w of ibuprofen and about 0.05% w/w of phenylephrine or a pharmaceutically acceptable salt thereof, expressed as equivalent concentration of phenylephrine hydrochloride. With those compositions, it is possible to administer, for example, a dose of about 100 mg of ibuprofen and about 2.5 mg of phenylephrine, or of about 200 mg of ibuprofen and about 5 mg of phenylephrine, or of about 300 mg of ibuprofen and about 7.5 mg of phenylephrine or of about 400 mg of ibuprofen and about 10 mg of phenylephrine, wherein the amount of phenylephrine is expressed as equivalent weight of phenylephrine hydrochloride.

In another preferred composition the weight ratio ibuprofen:phenylephrine is about 20:1 (also calculated taking the weight of the equivalent amount of phenylephrine hydrochloride), for example, compositions comprising about 4% w/v of ibuprofen and about 0.2% w/v of phenylephrine or a pharmaceutically acceptable salt thereof, expressed as equivalent concentration of phenylephrine hydrochloride. With those compositions, it is possible to administer, for example, a dose of about 100 mg of ibuprofen and about 5 mg of phenylephrine, or of about 200 mg of ibuprofen and about 10 mg of phenylephrine, or of about 400 mg of ibuprofen and about 20 mg of phenylephrine, wherein the amount of phenylephrine is expressed as equivalent weight of phenylephrine hydrochloride.

Preparation Process

Another aspect of the invention is a process for preparing the composition.

A suitable process for preparing the composition of the invention comprises the following steps:
(i) mixing hypromellose, xanthan gum and one part of the liquid maltitol with one part of total water to obtain a homogeneous mixture;
(ii) separately mixing ibuprofen, phenylephrine or a pharmaceutically acceptable salt thereof, glycerine and the rest of liquid maltitol with another part of total water, to obtain a homogeneous mixture;
(iii) adding the mixture of step (ii) to the mixture of step (i);
(iv) adding the rest of water.

All ingredients are added under continuous stirring. For example, steps (i) and (ii) may be performed in stainless steel reactors provided with agitation system and, preferably, also with heating jacket.

In step (i) the exact proportion of water used to prepare the first mixture is not critical, and may be, for example, from about 15% to about 50% of total water.

When the composition comprises a preservative, a pH adjusting agent and/or a flavour enhancer, they are preferably added in this step, preferably previously dissolved in the water, before adding hypromellose, xanthan gum and liquid maltitol. When the composition comprises a sweetening agent, it may also be added in this step, in the same way.

Typically, the mixture obtained in step (i) has a gel-like appearance. Typically, after adding hypromellose and xanthan gum, the mixture is stirred for about 2 to 6 hours, preferably under heating at about 40-80° C., until a gel-like mixture is obtained. Maltitol is preferably added subsequently.

In step (ii) the amount of water used to prepare the second mixture is not critical either, and may be, for example, from about 5% to about 25% of total water.

The mixture obtained in step (ii) is a suspension.

When the composition comprises a flavouring agent, it may be added, for example, after step (iii), and before step (iv), so the flavour, and optionally a sweetening agent if present, may be dissolved in one part of water (for example, of about 0.5% to 5% of the total water of the composition), and added to the mixture obtained in step (iii).

The composition may be filled in suitable bottles, typically, in polyethylene terephthalate (PET) amber bottles, provided with a suitable cap, preferably, a children-proof cap, typically of high-density polyethylene (HDPE).

The package may also include a measuring device to dispense the required dose of the composition, for example, a graduated cup or oral syringe.

Alternatively, the composition may be filled into monodose sachets, adding a suitable volume to deliver the required dose, for example, volumes typically comprised between about 5 ml and about 10 ml, such as 5 ml, 7.5 ml or 10 ml. Other volumes may also be suitable, depending on the desired dose and the concentration of the composition. Suitable sachets for liquid compositions may be made, for example, of laminated materials, for example, Polyester/Aluminium/Polyester/Polythene (PET/Alu/PET/PE).

Use of the Composition

The composition according to the present invention has optimal organoleptic properties, so the bitter taste of ibuprofen and phenylephrine as well as the burning sensation commonly associated to ibuprofen are completely masked.

Additionally, as disclosed in Example 2, the stability tests performed confirm that the composition according to the present invention is outstandingly stable, despite the fact that phenylephrine is known to be highly susceptible to degradation. Thus, the content of both active substances, ibuprofen and phenylephrine, remained between 95-105% and the degradation products derived from the active substances were below 0.1% in all storage conditions, namely, 25° C.-60% RH for 36 months, 30° C.-65% RH for 36 months, 30° C.-75% RH for 36 months and 40° C.-75% RH for 6 months.

Moreover, the composition also remained physically stable in those storage conditions, and neither aggregation nor precipitation phenomena were detected. This is important to ensure that a correct dose of the active substances is administered along the whole shelf-life of the medicinal product.

Furthermore, in a pharmacokinetic comparative test, healthy subjects were administered either the composition of the invention in a dose of 400 mg of ibuprofen and 10 mg of phenylephrine hydrochloride, or the reference medicine (2 tablets of Nurofen® Day & Night Cold & Flu 200 mg/5 mg tablets, Reckitt Benckiser Healthcare, UK), also comprising the same dose of active ingredients, both in a single administration, and it was found that the biological availability of ibuprofen was higher in those subjects taking the composition of the present invention than in those taking the reference medicine, with approximately 10% greater absorption of ibuprofen in the former. This was considered surprising, since the present composition comprises maltitol, an active excipient which is known for enhancing gastric motility and reducing the permanence time of the drugs in the intestinal lumen and, therefore, a lower, rather than higher, bioavailability would be expected.

Moreover, such comparative test also showed that the time to reach the maximum concentration observed in plasma ($T_{max}$) of both ibuprofen and phenylephrine was quicker in those subjects taking the composition according to the present invention than in those taking the reference medicine. Thus, $T_{max}$ for ibuprofen was about 1 h shorter (namely, the value of $T_{max}$ was 1.0 h compared to 2.0 h for ibuprofen in the reference compound) and $T_{max}$ for phenylephrine was 0.34 h shorter (namely, the value of $T_{max}$ was 0.33 h compared to 0.67 h for phenylephrine in the reference compound). This surprising quicker absorption would provide also a quicker therapeutic effect, thus making the current composition a fast-acting medicine that provides a favourable environment for early and potent therapeutic effect.

Another advantage of the present composition, compared to the commercial solid oral formulations, is the dosage flexibility. Thus, for example, the administered dose of ibuprofen could range from about 40 mg, for example, to about 400 or 600 mg, associated with from about 1 mg to about 10 or 15 mg, for example, of phenylephrine (expressed as equivalent phenylephrine hydrochloride), among other options.

This dosage flexibility allows to customize the doses according to the severity of symptoms and to the age of the patients, particularly for paediatric patients. In this way, for example, children with ages ranging from 7 to 9 can take 200 mg of ibuprofen and 5 mg of phenylephrine, children with ages ranging from 10-12 can take 300 mg ibuprofen and 7.5 mg of phenylephrine and adults and elderly can take 400 ibuprofen and 10 mg of phenylephrine, wherein the amount of phenylephrine is expressed as the equivalent weight of phenylephrine hydrochloride.

Therefore, another aspect of the present invention is the composition, as defined above, for use in medicine, in particular, for use in the treatment of symptoms of flu and common cold, such as fever, pain, sore throat, blocked nose and sinuses. The composition of the invention is suitable for this use both in adults, including elder adults, and in children, particularly in children over 7 years. In one embodiment, the use is for adults and for children over 7 years.

Another aspect of the invention is a method of treating the symptoms of flu and common cold, such as fever, pain, sore throat, blocked nose and sinuses, comprising the step of administering a therapeutically effective dose of the composition according to the present invention to a patient in need thereof. The patient may be an adult, including an elder patient, or a child, particularly a child over 7 years of age. In one embodiment, the method is for treating adults and children over 7 years of age.

Another aspect of the present invention is the use of the composition of the present invention, as defined above, for the preparation of a medicine for the treatment of symptoms of flu and common cold, such as fever, pain, sore throat, blocked nose and sinuses. The treatment can be addressed to any patient in need thereof, including both adults (including elder adults) and children (in particular, children over 7 years of age). In one embodiment, the treatment is for adults and for children over 7 years of age.

EXAMPLES

Example 1: Suspension Formulation Comprising Ibuprofen and Phenylephrine HCl

A composition according to the present invention was prepared using the ingredients listed in the following table:

| Ingredient | % (w/v) | mg/ml |
|---|---|---|
| Ibuprofen | 4.0 | 40.0 |
| Phenylephrine HCl | 0.1 | 1.0 |
| Hypromellose | 0.5 | 5.0 |
| Xanthan gum | 0.4 | 4.0 |
| Liquid maltitol | 50.0 | 500.0 |
| Glycerine | 10.0 | 100.0 |
| Anhydrous citric acid | 0.74 | 7.4 |
| Sodium citrate | 0.52 | 5.2 |
| Sodium chloride | 0.1-5.0 | 1.0-50 |
| Thaumatin | 0.0001-0.01 | 0.001-0.1 |
| Saccharin sodium | 0.01-0.5 | 0.1-5.0 |
| Sodium benzoate | 0.02-0.5 | 0.2-5.0 |
| Orange flavour | 0.001-0.1 | 0.01-1.0 |
| Purified water | q.s. | q.s. 1.0 ml |

The hypromellose used was hypromellose 15 cP (substitution type 2910). The particle size of ibuprofen was 40 µm.

For preparing the composition, a stainless-steel reactor equipped with agitation system and heating jacket was filled with purified water equivalent to about 30% of the final batch, and sodium benzoate, anhydrous citric acid, sodium citrate, saccharin sodium and sodium chloride were stepwise added to the reactor under continuous agitation until total dissolution. Subsequently, hypromellose was added under stirring until total dispersion, and then xanthan gum was also added, and the mixture was left under agitation for about 3 hours until gelification, and subsequently, about half of the liquid maltitol was added.

A secondary stainless-steel reactor equipped with agitation and heating jacket, was filled with about 10% of total water, subsequently, glycerine, the rest of liquid maltitol, phenylephrine HCl and ibuprofen were stepwise added under agitation until obtaining a homogeneous suspension. This suspension was mixed with the contents of the first reactor, under stirring, until obtaining a homogeneous suspension.

A secondary stainless-steel reactor was filled with about 2% of total water, and the orange flavour and thaumatin were added under agitation until complete dissolution, and this solution was added to the suspension previously prepared in the main reactor.

The final product was a white or almost white viscous suspension, with characteristic orange odour. The pH was about 3.8.

The product was filled into PET amber bottles of 100 and 150 ml, equipped with graduated cup and oral syringe.

Example 2: Stability Data

The product of Example 1 was subjected to long-term and accelerated stability studies according to ICH Guidelines valid for the 4 climatic zones, (25° C.±2° C./60%±5% RH, 30° C.±2° C./65%±5% RH, 30° C.±2° C./75%±5% RH and 40° C.±2° C./75%±5% RH) for 3 batches of the product in its final containers, i.e. 100 and 150 ml, and an additional condition of fridge (2-8° C.) for only one batch in both size containers.

The stability of the product was evaluated up to a period of 36 months, considering the following parameters: appearance, pH, viscosity, dissolution of ibuprofen, particle size in terms of sedimentation and particle size of the particles in suspension (absence of agglomerates), assay of ibuprofen (HPLC), assay of phenylephrine HCl (HPLC), related substances of ibuprofen (HPLC), and related substances of phenylephrine HCl (HPLC).

The obtained results showed optimal values for all the assessed parameters, which confirmed the stability of the product for all batches and for all conditions, and therefore it was concluded that the product does not require any special storage conditions.

The analysis of impurities related to phenylephrine revealed very low levels of all impurities for all batches and all conditions, with no reportable amounts of impurities in all cases (<0.5%).

Also, the analysis of impurities related to ibuprofen showed very low levels of all impurities for all batches and all conditions, with no reportable amounts, either (<0.1%).

Besides, one batch of product was also subjected to photostability study (ICH Q1B). According to the conditions of the assay, the product was irradiated with 1.2 million luxes and UV integrated energy of 200 watts/m$^2$. The following parameters were assessed: description, pH, viscosity, dissolution of ibuprofen, assay of ibuprofen (HPLC), assay of phenylephrine HCl (HPLC), assay of sodium benzoate (HPLC), related substances of ibuprofen (HPLC) and related substances of phenylephrine HCl (HPLC). The product was found stable to light in the assessed conditions, so the product does not require special conditions either.

Finally, an in-use stability study with the 3 manufactured batches was carried out analysing the following parameters: appearance, pH, viscosity, dissolution of ibuprofen, assay of ibuprofen (HPLC), assay of phenylephrine HCl (HPLC), assay of sodium benzoate (HPLC), related substances of ibuprofen (HPLC), related substances of phenylephrine HCl (HPLC), microbiological quality and efficacy of antimicrobial preservation. It was concluded that, during the use, the product is maintained without any loss of its physical properties and/or quantification/degradation, at least for 6 months in the four climate zones.

Example 3: Pharmacokinetic Comparative Study

A phase I, randomized, open-label, single-dose, single-centre study under fasting conditions and crossover design, with two-periods, two-sequences, and a wash-out period of at least 3 days was performed in 23 healthy male and female volunteers, aged from 18 to 55.

The tested product was the composition of Example 1, which was given in a single administration, in a dose containing 400 mg of ibuprofen and 10 mg of phenylephrine HCl (i.e., 10 ml of the composition).

The reference medicine were two tablets of Nurofen® Day & Night Cold & Flu 200 mg/5 mg tablets (UK, Reckitt Benckiser Healthcare) given also in a single administration, equivalent to 400 mg of ibuprofen and 10 mg of phenylephrine HCl.

The mean values found for $C_{max}$ and AUC for ibuprofen enantiomers for the composition of Example 1 and for the reference medicine are shown in the following table:

| Parameters | R-Ibuprofen | | S-ibuprofen | |
| --- | --- | --- | --- | --- |
| | Example 1 | Reference | Example 1 | Reference |
| $C_{max}$ (ng/mL) | 20464.84 | 18699.86 | 18021.21 | 15941.72 |
| $AUC_{0-t}$ (ng*h/mL | 62578.29 | 60768.06 | 65366.45 | 61261.66 |

$T_{max}$ mean value for ibuprofen was 1.0 h for the composition of Example 1 and 2.0 h for the reference medicine.

$T_{max}$ mean value for phenylephrine was 0.33 h for the composition of Example 1 and 0.67 h for the reference medicine.

The invention claimed is:

1. A liquid pharmaceutical composition for oral administration in the form of suspension which comprises:
    a) Ibuprofen in an amount comprised between 2% w/v and 10% w/v;
    b) phenylephrine or a pharmaceutically acceptable salt thereof, in an amount comprised between 0.005% w/v and 2% w/v, expressed as equivalent amount of phenylephrine hydrochloride;
    c) hypromellose, in an amount comprised between 0.1% w/v and 5% w/v;
    d) xanthan gum, in an amount comprised between 0.05% w/v and 4% w/v;
    e) liquid maltitol;
    f) glycerine; and
    g) water.

2. The composition according to claim 1, wherein phenylephrine is in the form of a salt selected from phenylephrine hydrochloride, phenylephrine hydrobromide and phenylephrine bitartrate.

3. The composition according to claim 2, wherein phenylephrine is in the form of phenylephrine hydrochloride.

4. The composition according to claim 1, wherein the amount of ibuprofen is comprised between 3% w/v and 5% w/v.

5. The composition according to claim 1, wherein the amount of phenylephrine or a pharmaceutically acceptable salt thereof is comprised between 0.08% w/v and 0.2% w/v, expressed as equivalent amount of phenylephrine hydrochloride.

6. The composition according to claim 1, wherein the amount of hypromellose is comprised between 0.2% w/v and 2% w/v.

7. The composition according to claim 1, wherein the amount of xanthan gum is comprised between 0.1% w/v and 2% w/v.

8. The composition according to claim 1, wherein the amount of liquid maltitol is comprised between 30% w/v and 70% w/v.

9. The composition according to claim 1, wherein the amount of glycerine is comprised between 5% w/v and 15% w/v.

10. The composition according to claim 1, wherein said composition comprises a pH adjusting agent to adjust the pH of the composition to a value comprised between 2 and 6.

11. The composition according to claim 1, wherein said composition comprises a preservative.

12. The composition according to claim 1, wherein said composition comprises a sweetening agent selected from acesulfame potassium, alitame, neohesperidin dihydrochalcone, neotame, saccharin, saccharin sodium, sucralose, thaumatin, and mixtures thereof.

13. The composition according to claim 1, wherein said composition comprises sodium chloride.

14. A process for preparing the composition of claim 1, wherein said process comprises the following steps:
   (i) mixing hypromellose, xanthan gum and one part of the liquid maltitol with one part of total water to obtain a homogeneous mixture;
   (ii) separately mixing ibuprofen, phenylephrine or a pharmaceutically acceptable salt thereof, glycerine and the rest of liquid maltitol with another part of total water, to obtain a homogeneous mixture;
   (iii) adding the mixture of step (ii) to the mixture of step (i);
   (iv) adding the rest of water.

15. A method of treating symptoms of flu and common cold, comprising administering a therapeutically effective dose of the composition according to claim 1 to a patient in need thereof.

16. The composition according to claim 1, wherein the amount of hypromellose is comprised between 0.4% w/v and 0.6% w/v.

17. The composition according to claim 1, wherein the amount of xanthan gum is comprised between 0.3% w/v and 0.6% w/v.

18. The composition according to claim 1, wherein the amount of liquid maltitol is comprised between 45% w/v and 55% w/v.

19. The composition according to claim 1, wherein the amount of glycerine is comprised between 9% w/v and 11% w/v.

20. The composition according to claim 1, wherein said composition comprises a mixture of saccharin sodium and thaumatin as sweetening agent.

* * * * *